United States Patent
Loomans (10) Patent No.: US 6,549,908 B1
(45) Date of Patent: Apr. 15, 2003

(54) METHODS AND APPARATUS FOR INTERPRETING USER SELECTIONS IN THE CONTEXT OF A RELATION DISTRIBUTED AS A SET OF ORTHOGONALIZED SUB-RELATIONS

(75) Inventor: Jeffrey Loomans, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/442,594

(22) Filed: Nov. 17, 1999

Related U.S. Application Data (60) Provisional application No. 60/109,077, filed on Nov. 18, 1998.

(51) Int. Cl.$^7$ ............................................. G06F 17/30
(52) U.S. Cl. ................................ 707/101; 707/4; 707/5
(58) Field of Search ........................... 707/1, 4, 5, 10, 707/101

(56) References Cited

U.S. PATENT DOCUMENTS

| | | | |
|---|---|---|---|
| 5,557,787 A | * | 9/1996 | Shin et al. .................. 707/102 |
| 5,708,798 A | | 1/1998 | Lynch et al. |
| 5,745,765 A | | 4/1998 | Paseman |
| 5,825,651 A | | 10/1998 | Gupta et al. |
| 6,009,239 A | * | 12/1999 | Morita et al. .................. 706/47 |

OTHER PUBLICATIONS

Chang Li et al, Optimizing Statistical Queries by Exploiting Orthogonality and Interval Properties of Grouping Relations, IEEE, 1996, pp. 118–127.*

R Jane et al, Adaptive Hermite Models for ECG Data Compression: Performance and Evaluation with Automatic Wave Detection, IEEE 1993, pp. 389–392.*

Flip Korn et al, Efficiency Supporting Ad Hoc Queries in Large Datasets o Time Sequences, ACM 1997, pp. 289–300.*

* cited by examiner

*Primary Examiner*—John Breene
*Assistant Examiner*—Debbie Le
(74) *Attorney, Agent, or Firm*—Blakely Sokoloff Taylor Zafman LLP (57) ABSTRACT

Methods and apparatus for distributing a first relation amongst a set of orthogonal sub-relations are disclosed. As a method, an orthogonal sub-relation of the set of orthogonal sub-relations is identified and then removed from the first relation. The removed sub-relation is then replaced with an associated reference that points to the removed sub-relation to form a distributed relation. A reduced first relation that is substantially reduced in size as compared to the first relation, such that the distributed relation is formed of the reduced first relation and all the referenced orthogonal sub-relations.

15 Claims, 10 Drawing Sheets

"COLOR OPTION" TABLE
600

| CODE (602) | DESC (604) | FRENCH-OEM DESC (606) | ADDED COST (608) |
|---|---|---|---|
| R | "RED" | "ROUGE" | 0.00 |
| B | "BLUE" | "BLEU" | 1000.00 |
| G | "GREEN" | "VERT" | 10.00 |
| ⋮ | ⋮ | ⋮ | ⋮ |

|  | TABLE HEADER 802 |  |
|---|---|---|
|  | COLUMN MASK 804 |  |
|  | TABLE ROWS 806 |  |
|  | EXCEPTION ROWS 808 |  |

| COLOR | SIZE | COST | NOTE |
|---|---|---|---|
| 1 | 1 | 0 | 0 |
| RED<br>RED<br>BLUE | SMALL<br>STANDARD<br>LARGE | 10.00<br>20.00<br>100.00 |  |
| RED<br><br>BLUE | LARGE |  | RED AND LARGE NOT AVAILABLE<br><br>ONLY BLUE IN LARGE |

802 — (header row)
804 — (column mask row)
806 — (table rows)
808 — (exception rows)

| COLOR | SIZE | OPTION$_3$ | OPTION$_4$ | ... | OPTION$_6$ | OPTION$_7$ |
|---|---|---|---|---|---|---|
| 100 VALUES | 100 VALUES | 100 VALUES | 100 VALUES | ... | 100 VALUES | 100 VALUES |

FIG. 7A

= $100^7$ COMBINATIONS
($10^{14}$ ROWS)

SUB-TABLE 902

| COLOR | SIZE |
|---|---|

↑
200 LEGAL COMBINATIONS
(200 ROWS)

SUB-TABLE 904

| COLOR | SIZE | OPTION$_3$ |
|---|---|---|

↑
500 LEGAL COMBINATIONS
(500 ROWS)

SUB-TABLE 906

| OPTION$_4$ | OPTION$_7$ |
|---|---|

↑
3 LEGAL COMBINATIONS
(3 ROWS)

FIG. 7B

0 VALUES

| COLOR | SIZE | OPTION$_3$ | OPTION$_4$ | OPTION$_5$ | OPTION$_6$ | OPTION$_7$ |
|---|---|---|---|---|---|---|
| 0 VALUES | 0 VALUES | 0 VALUES | 0 VALUES | 100 VALUES | 100 VALUES | 0 VALUES |

| COLOR | SIZE |
|---|---|

200 ROWS

| COLOR | SIZE | OPTION$_3$ |
|---|---|---|

500 ROWS

| OPTION$_4$ | OPTION$_7$ |
|---|---|

3 ROWS

METHODS AND APPARATUS FOR INTERPRETING USER SELECTIONS IN THE CONTEXT OF A RELATION DISTRIBUTED AS A SET OF ORTHOGONALIZED SUB-RELATIONS

CROSS REFERENCE TO RELATED APPLICATIONS

This application claims benefit of priority under 35 U.S.C. §119(e) of U.S. Provisional Application No. 60/109,077 filed Nov. 18, 1998, and entitled "LEVERAGING THE WEB: ARCHITECTURE MATTERS" which is hereby incorporated by reference. This application is also related to co-pending patent application Ser. No. 09/440,307 entitled "AN APPARATUS AND SYSTEM FOR EFFICIENT DELIVERY AND DEPLOYMENT OF AN APPLICATION" filed on Nov. 17, 1999, which is assigned to the assignee of the present application and is incorporated herein by reference in its entirety.

BACKGROUND OF THE INVENTION

1. Field of Invention

The invention relates generally to computer systems. More particularly, methods and apparatus for providing a data-modeling schema for efficiently representing complex products and selling processes in a computer system are disclosed.

2. Description of Relevant Art

Generally speaking, a browser is an application program that provides a way to look at and interact with information on distributed computer networks such as the Internet. In particular, a Web browser is a client program that uses the Hypertext Transfer Protocol (HTTP) to make requests of Web servers throughout the Internet on behalf of the browser user. One of the most recent uses of browsers is in the realm of electronic (e-) commerce in which any number of client side users (i.e. "e-customers") interact in a real time basis with any number of server side processors (i.e., "e-sellers") over the Internet. In order to transact business in a Web-based environment, browsers typically execute Web commerce applications specifically designed to facilitate e-commerce transactions such as requesting quotes, selecting options and assembling components into complex bundles, and placing orders.

In this regard, successful Web commerce applications must be capable of automating a customer through the entire buying cycle, from initial inspection to final purchase and shipping, in addition to providing the customer all relevant information required to make a buying decision and providing customer guidance. As the complexity of the buying cycle and/or the purchases themselves increases—for instance, from buying office supplies to buying mainframe computers—a general purpose Web commerce application must scale its ability to manage this complexity. In order to accomplish this, a general purpose Web commerce application must be: 1) fast loading and highly responsive in "click over click" type scenarios in order to support highly interactive customer sessions such that a buyer can input any and all relevant information quickly and with apparently little or no delay in application response; 2) powerful in its ability to process relevant data from a broad range of possible choices, configurations, and problem domains quickly—in other words, a general purpose Web commerce application should have the flexibility and computational power of a conventional programming language; 3) the application must be robust in that it can run on a wide variety of client machines while maintaining greater than 99% up time, and finally; 4) the Web commerce application must be highly scalable given the unpredictable and potentially large number of buyers who may simultaneously access the application online.

However, in addition to a highly interactive and robust e-commerce application, selling complex products via the Web requires the presentation of vast amounts of information that buyers can navigate through and interact with in a concise, meaningful way. This information typically includes a number of complex entities, each with specific attributes forming intricate relations with one another that must be calibrated for the customer.

In the past, organizations have attempted to solve the problem of representing complex products by employing custom applications that rely on highly specialized software programming techniques. The use of artificial intelligence applications and other complex approaches has produced expensive solutions that are costly to maintain. One such approach relies on the memorialization of business rules in code. Another approach relies on the representation in code of formal mathematical constraints on product selection parameters. Unfortunately, however, by coding business rules and logic in programming languages such as C++, LISP, or Visual Basic, organizations have tied themselves to the expensive skills of application programmers. For example, even trivial changes in the way a company markets and sells its offerings may require the services of a trained software developer.

In an attempt to avoid the high cost of programmers, some companies have turned to configuration toolkits (referred to in the art as Fourth Generation Languages, or 4GL) that create an abstraction layer for the maintainers of the system. However, the underlying details of the system are still reflected in application code masked by the 4GL. This both limits flexibility and introduces a requirement for developers trained in the use of the 4GL itself. In order to achieve flexibility in maintaining their presence with the customer, companies generally resort to diving "below the surface" to change application code and modify rules. This has generally resulted in companies having to cultivate both 4GL and conventional development skills within their organizations.

More recently, organizations have been shifting to Web sales applications to create efficiencies in the selling process and reach new buyers. As they realize those goals and more people rely on the systems, both the computing power for processing the application code and the frequency with which updates are made must scale with that success. The traditional solutions to this problem discussed above lead to decreased margins and a downward spiral in profitability. Furthermore, as the power of these systems drives more purchasing activities online, companies must pour more and more expensive development resources into creating and updating new product representations in code. The costs to provide this solution increase while customer satisfaction decreases due to limitations in the flexibility and expense of maintenance of the coded models.

Therefore, what is required is a method of representing complex products and selling processes purely in data models and an apparatus embodied in a computer system that eliminates any requirement for the use of programming languages by those who create and maintain these applications.

SUMMARY OF THE INVENTION

In one embodiment of the invention, a computer implemented method of distributing a first relation amongst a set of orthogonal sub-relations is described. An orthogonal sub-relation from the set of orthogonal sub-relations is identified and removed from the first relation. All orthogonal sub-relations that can be successively identified in the first relation are successively removed to form a reduced first relation that is substantially reduced in size as compared to the first relation. In this way, the distributed relation is formed of the reduced first relation and a set of referenced orthogonal sub-relations.

In a preferred embodiment, an engine reconstructs the first relation by evaluating the distributed relation.

In another embodiment of the invention, a computer program product in the form of computer codes that are stored in a computer readable medium that is used for distributing a first relation amongst a set of orthogonal sub-relations is disclosed.

In still another embodiment, a main table T is used to define a relation across all options by listing all possible combinations of all option values, and a plurality of associated sub-tables represent orthogonal relations between each of a plurality of subsets of options as defined by the main table T. As a method, each value in the set S is checked against a corresponding masked column in each row of the table T until a match is found for all such masked columns. If it is determined that each of the values in the set S matches each of the corresponding masked columns for at least one row in the main table T, then each matching value in the set S is looked up in an associated option table. All translations for the associated option table are then added to the set S to form a translated set S. If a matched row does not contains a reference to any of the plurality of sub-tables then the translated set S is displayed, otherwise, each sub-table is recursively matched until there are no further references.

In yet another embodiment of the invention, a computer program product in the form of computer codes that are stored in a computer readable medium that is used for interpreting a user selected set of options S each of which has an associated option value is disclosed.

BRIEF DESCRIPTION OF THE DRAWINGS

The invention, together with further advantages thereof, may best be understood by reference to the following description taken in conjunction with the accompanying drawings.

DETAILED DESCRIPTION OF THE EMBODIMENTS

In the following description, frameworks and methods of representing complex products and selling processes purely in data models are described. In addition, an apparatus embodied in a computer system that eliminates any requirement for the use of programming languages by those who create and maintain these applications is also described.

It should be noted that although the invention is described in terms of the Internet, any distributed network can be suitably employed to implement any desired embodiment of the invention. It is one of the advantages of the invention that it is well suited for low bandwidth systems capable of executing client side applications. Such low bandwidth systems include, but are not limited to virtual private networks, direct serial connections across telephone lines ("BBS systems"), and LANs and WANs regardless of network protocol.

When implemented in a network using the HTTP protocol, such as the Internet, when an end user (i.e., client) desires to run an application within a browser environment, the end user generates an HTTP request for a resource identified by a URL (universal resource locator). In one implementation, this request is transmitted by way of a distributed network, such as the Internet, to a server computer In response to the URL, the server computer provides an HTTP response in the form of an HTML page generally consisting of the "expected" interface page and an application engine. Once all required user load time components are available, the application engine can then proceed in processing user supplied inputs in the particularized context of the received data and any API extension code during what is referred to as a sub-application. It should be noted that in almost all cases, a user session will consist of a series of different sub-applications as, for example, a user navigates the application interface and interacts with the different sections each with its own particularized UI and data. Potentially, for each sub-application, data that represents the complex system to be configured is downloaded in the form of the inventive schema at the outset of what is referred to as a configuration session. Once all appropriate data is available, the application engine then proceeds to process user inputs as selections of particular choices defined by the schema, and processes the data to arrive at configuration outcomes.

It should be noted that the inventive schema that is provided takes the form of data sets configured as well-defined tables that describe relationships between selections and associated outputs. In one implementation, the tables include a master table, a set of feature tables, and a set of sub-tables. In a preferred embodiment, each configuration session (also referred to as a product family) is associated with a unique schema for each set of master, feature and sub-tables within an overall data repository. In this way, only a minimum number of data elements are required to be loaded per configuration session, any modifications to associated configuration logic are localized to just the set of affected pages and schemas, and each of the schemas are completely independent of each other in that there are no defined interdependencies between any of them. In this way, there are no requirements for programming languages to represent complex products and selling processes in a computer system as required in conventional arrangements.

The invention will now be described in terms of a browser resident in a client computer that is typically used to execute a highly interactive e-commerce application. It should be noted, however, that any applications requiring the selection of inputs resulting in the calculation of finite discrete valued relations to produce outputs can also be implemented using the invention and therefore should not be construed as being limited to e-commerce transaction applications. It should also be noted, that the invention is well suited for any low bandwidth system in which user interactivity is a prime consideration.

Figure 1:
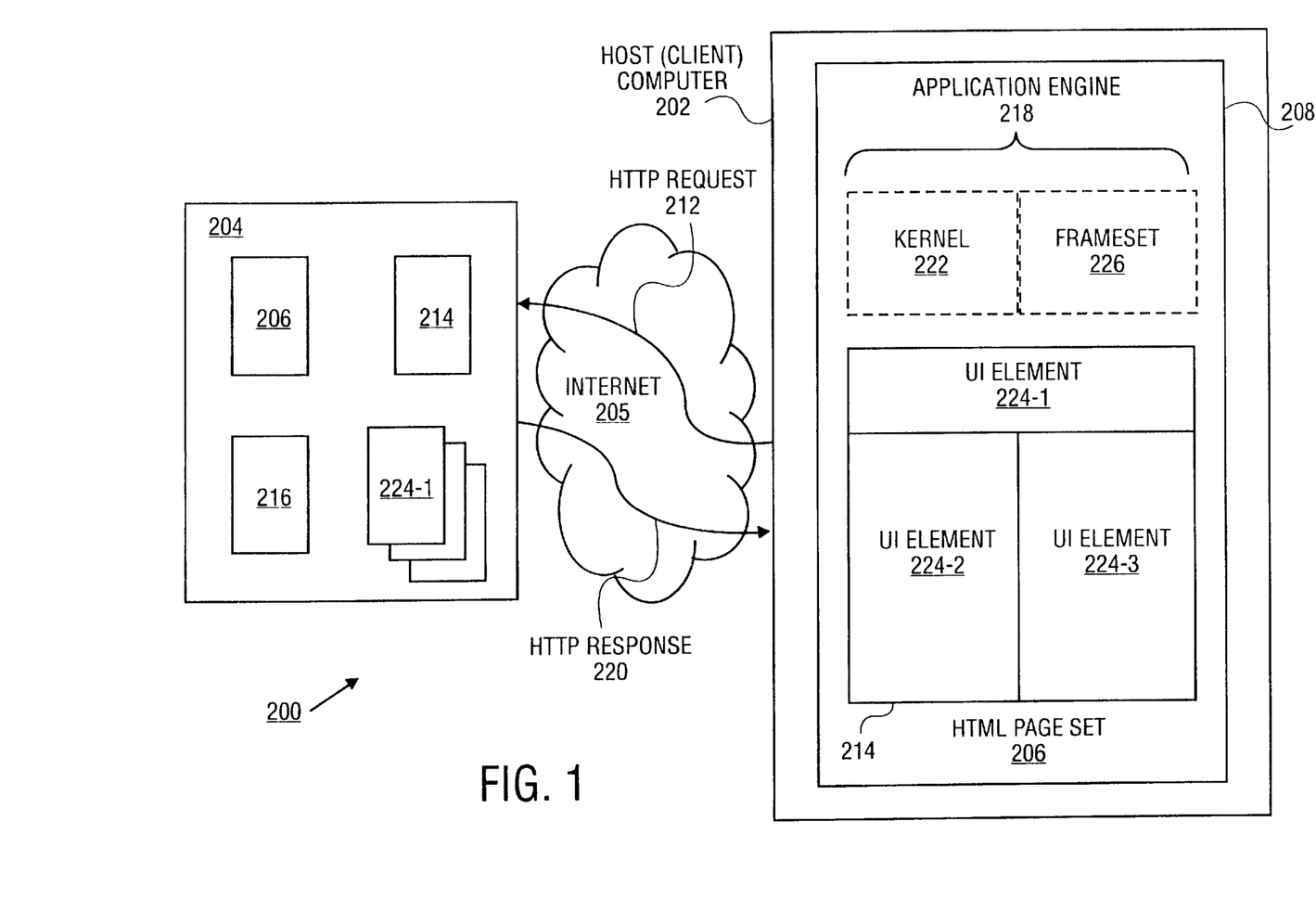
FIG. 1 shows a browser/server system in accordance with an embodiment of the invention.

Referring now to FIG. 1, a browser/server system 200 in accordance with an embodiment of the invention is shown. The system 200 includes a client computer 202 coupled to a server (host) computer 204. Typically, the host computer 204 is part of a distributed interconnected computer network 205 such as the Internet, but can also be part of a private wide or local area network (WAN/LAN) utilizing HTTP protocols, sometimes referred to as an intranet. It is one of the advantages of the invention that the interconnected computer network can be any low bandwidth system.

In order to facilitate communication between the various users and/or computers that form the network 205, the client computer 202 utilizes the graphical user interface resources presented by a Web page (sometimes referred to as an HTML page) 206 resident in a browser 208, most of which are obtained by various HTTP requests. When a user desires to download a particular HTML page 206 from the server 204, the browser 208 generates an HTTP request 212. The URL for the requested page 206 includes information related both to the location of the server computer 204, and to the location within the server computer 204 where the page 206 is located.

In contrast to conventionally configured HTML pages, the particular "shell" HTML page 206 is a frameset formed of a visible HTML page 214 and an associated frameset 216 that acts as a loader causing all components of an application engine 218 to download to the browser 208 by way of an HTTP response 220.

In the described embodiment, the frameset 214 defines the application engine 218 to include all required loadtime components that are ultimately incorporated into the browser 208 as a kernel 222. The application engine 218 interprets the files which will be loaded for the associated application, or appropriate sub-application, as well as how data is used to fill in each of the particular UI interface elements 224-1 through 224-3.

Once any initialization routines have been successfully completed, the application engine 218 is ready to begin processing user inputs via interface pages 224-1 through 224-3 in the particularized context of the data components in a frameset 226 and displaying, where appropriate, the result(s) in additional HTML pages generally in a visible frame 214.

Figure 2:
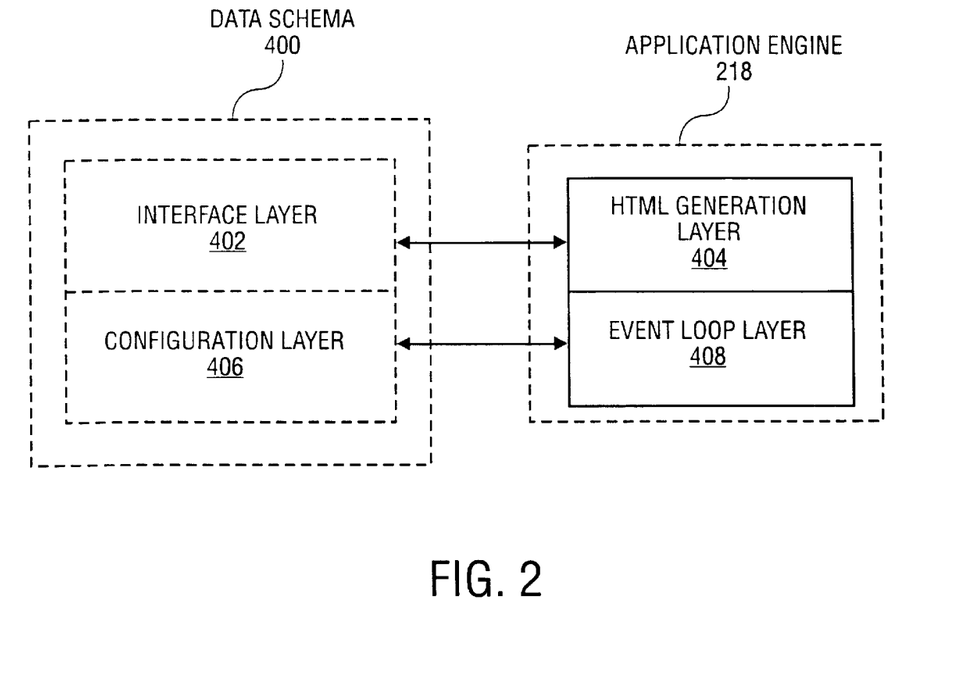
FIG. 2 illustrates an interaction profile between the application engine and an associated schema in accordance with an embodiment of the invention.

At the outset of what is referred to as a configuration session, a demand load of a configuration sub-application includes the data that will be used to evaluate and respond to user inputs. This data is downloaded in the form of the inventive schema. Refer now to FIG. 2 illustrating a general interaction profile between the application engine 218 and an associated unique schema 400 in accordance with an embodiment of the invention. In the described embodiment, the unique schema 400 is formed of physically distinct data layers each of which map to associated layers of the application engine 218. For example, the described schema 400 is formed of an interface layer 402 containing data supplied by way of the UI interfaces generated by an associated HTML generation layer 404 included in the application engine 218. The schema 400 also includes a configuration layer 406 containing tables both logically and physically distinct from the interface layer 402 that is associated with an event loop layer 408 included in the application engine 218. By using this arrangement based upon both logical and physical distinctness, it is possible to allow certain layers in the schema to be independently loaded. This allows certain layers to be loaded in parallel to user interactions with previously loaded layers thereby significantly increasing performance. For example, tables in configuration layer 406 are not required by HTML generation layer 404 for initial generation of the interface. Only the tables in interface layer 402 are therefore initially loaded; thereafter, while HTML layer 404 is generating the interface and the user is navigating it, configuration layer 406 is then loaded.

In addition, any modifications to the various layers localizes those data modifications to just the affected data layer; since the layers are logically as well as physically separate, changes do not propagate throughout the entire schema. In this way, the schema has been rendered substantial robust against perturbations in the data.

Figure 3:
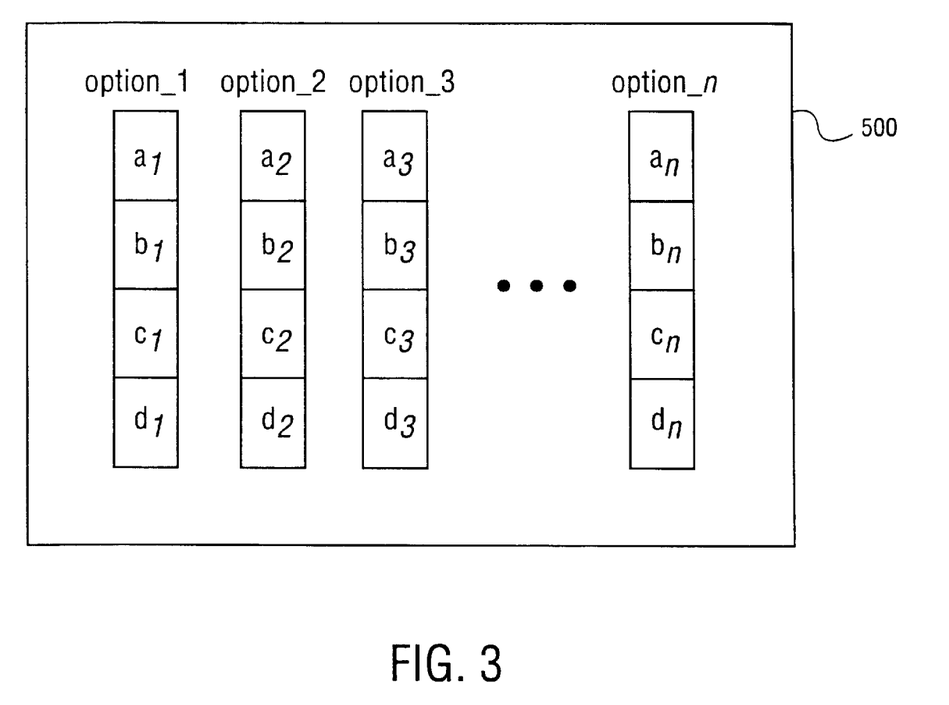
FIG. 3 illustrates an interface layer in accordance with an embodiment of the invention.
Figure 4:
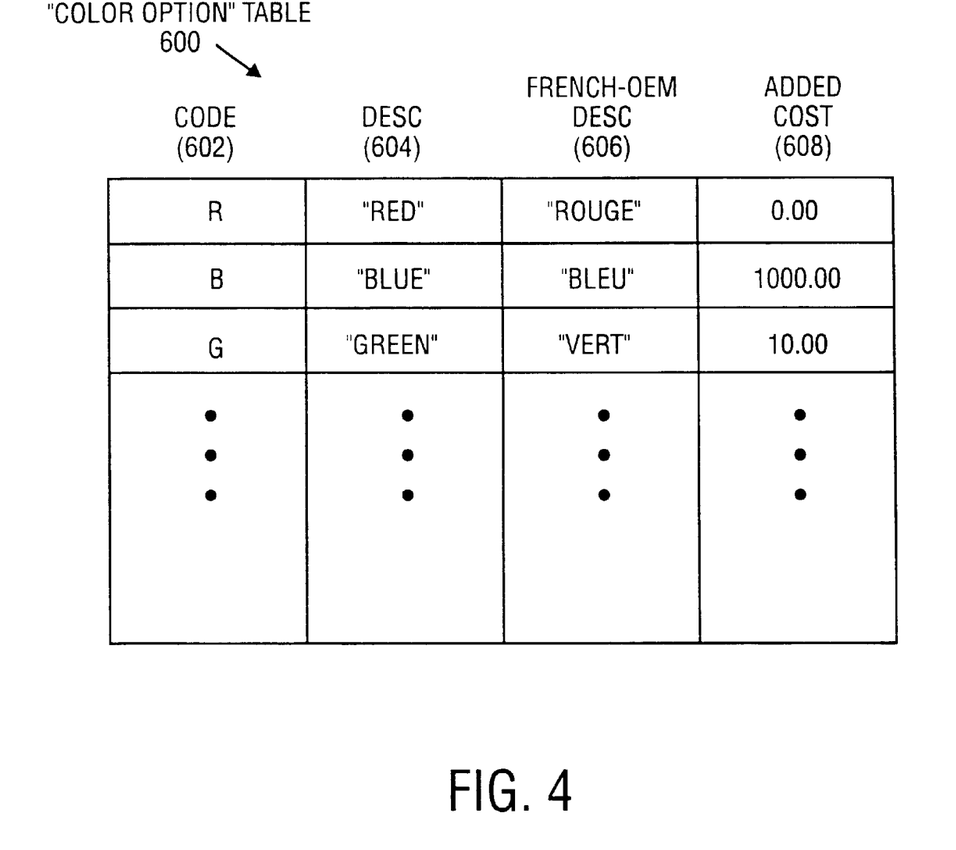
FIG. 4 shows an exemplary main table in accordance with an embodiment of the invention.

FIG. 3 illustrates an interface layer 500 particularized for a specific configuration sub-application in accordance with an embodiment of the invention. It should be noted that the interface layer 500 is but one possible implementation of the interface layer 402 and as such should not be construed as limiting the scope of the invention. As such, the interface layer 500 holds the potential value of all options that are possible in a particular configuration sub-application, whether those values are chosen by a user or selected by an associated event loop. As shown in FIG. 3, each option is represented as a unique table having a set of values included therein. For example, an option__1 table includes option__1 values $a_1$, $b_1$, $c_1$, and $d_1$, whereas an option__2 table includes option__2 values $a_2$–$d_2$. In the described embodiment, each table defines a finite discrete-valued relation between different translation sets of the possible values for each option in a particular table. For example, in one case shown in FIG. 4, the option__1 table in the interface layer 500 represents a color option table 600 that represents all possible color selection options for a particular transaction. In the described embodiment, the color option table 600 includes a "CODE" translation set 602 that is used in the configuration model discussed below, and a "DESC" translation set 604 that is displayed to the user in the user interface 224-1, for example. In addition to the basic color selections, a translation set 606 could be present that translates the color selections into French, for example, with an additional translation set 608 that describes the added cost (if any) of the selected option.

Figure 5:
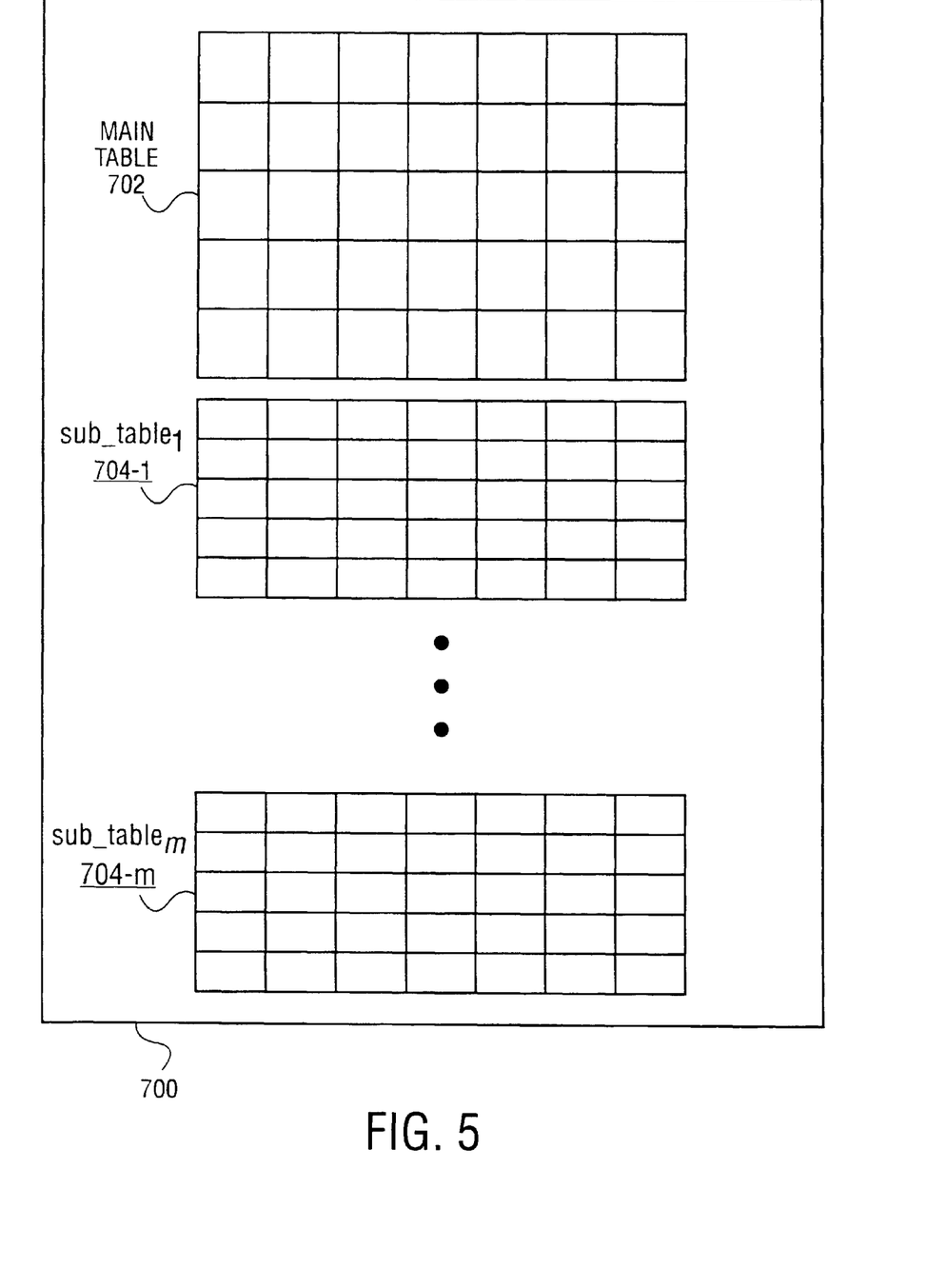
FIG. 5 illustrates a configuration layer in accordance with an embodiment of the invention.

In addition to the interface layer 402, the schema 400 includes the configuration layer 406, also referred to as a data frame and/or data segment. The configuration layer 406 holds all permissible combinations of option values across options in a particular product family configuration. These permissible combinations are represented as tables that encode the relations between the various options in the particular configuration. For example, FIG. 5 illustrates a configuration layer 700 in accordance with an embodiment of the invention. It should be noted that the configuration layer 700 is but one possible implementation of the configuration layer 406 and as such should not be construed as limiting the scope of the invention. As implemented, the configuration layer 700 includes a main table 702 and various sub-tables 704-1 through 704-m. In the described embodiment, the main table 702 defines all options across all relations in the schema 400. Given this, the main table 702 could be used to define a single relation across all options by listing all possible combinations of all option values. The various sub-tables 704-1 through 704-m represent orthogonal relations amongst the various subsets of options that are heretofore defined in the main table 702. Practically speaking, this orthogonalization of the main table 702 has the effect of drastically reducing the number of rows in the main table 702, potentially by several orders of magnitude, by removing table rows constituting the orthogonal relations from the main table 702. At calculation time, the relation will be evaluated and references to sub-tables will be traced by the application engine, effectively reconstructing the original single relation.

Figure 6A:
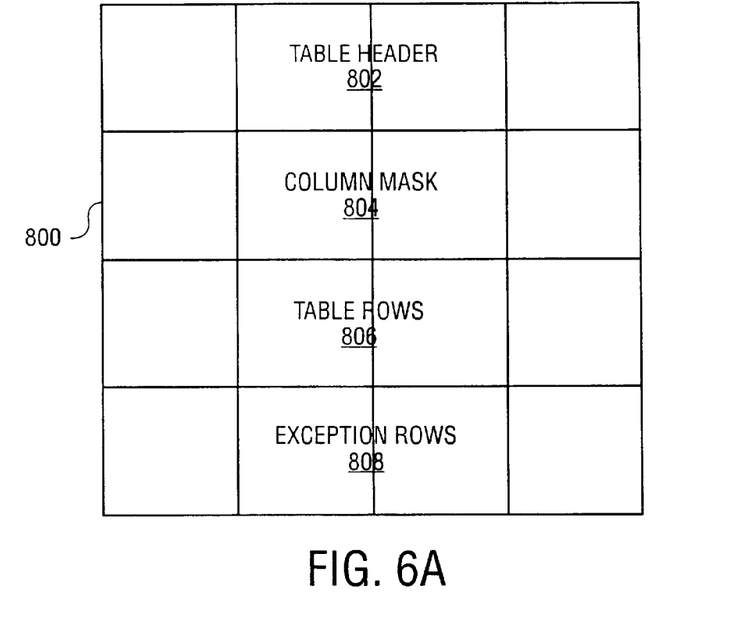
FIG. 6A illustrates an exemplary table in the data segment in accordance with an embodiment of the invention.
Figure 6B:
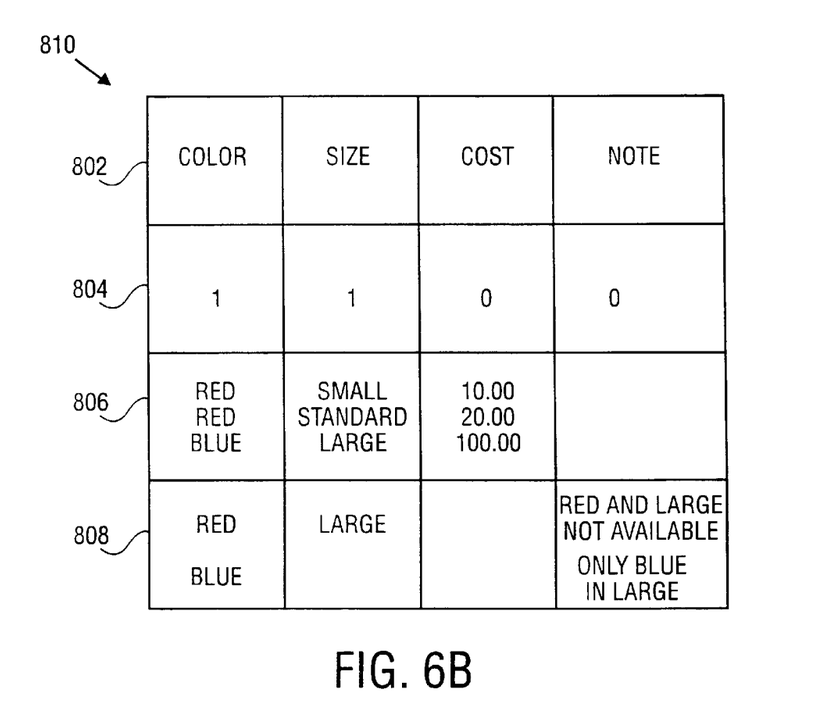
FIG. 6B illustrates a particular example of the main table shown in FIG. 6A.

In the described embodiment as shown in FIG. 6A, an exemplary table 800 in the data segment includes a table header 802 which identifies the columns in the table, a column mask 804 that identifies to the application engine 218 which of the columns are used to calculate the validity of a user selected set of options, table rows 806 that define permissible combinations of options values, and exception rows 808 that define rules that come into effect when permissible combinations are not found. For example, referring to FIG. 6B, an exemplary table 810 has a particular table header that includes "color", "size", "cost", and "note". The column mask indicates that "color" and "size" are selected by the user, whereas the table rows indicate the legal combinations of options and the relation of these to other non-user selected option values. The exception rows define those rules that take effect when a legal combination, e.g., "blue" and "small" is not selected.

Figure 7A:
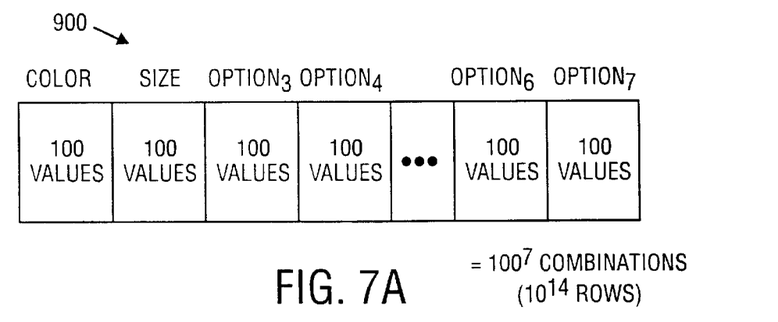
FIGS. 7A–7B shows a main table and associated sub-tables representing a particular transaction in accordance with an embodiment of the invention.
Figure 7B:
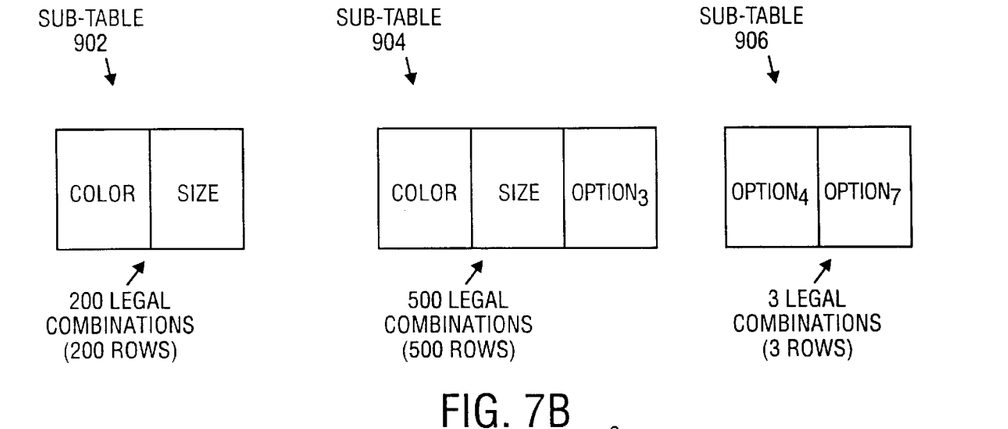

Referring now to FIG. 7A, a main table 900 representing a particular transaction includes 7 options that include color, size, and option3 through and including option7, where each option has 10 different values. In this configuration, if all 10 values of all the 7 options were explicitly represented as rows, the main table 900 would include $100^7$ combinations in $10^{14}$ (100 trillion!) rows of data—which clearly is not only far too large for a low bandwidth medium such as the Internet, but also too large to be practically represented and maintained in any computer system. In practice, however, only certain combinations of values are permissible, so it is possible to only represent valid combination. In addition, well defined sub-relations between proper subsets of options exist, so it is possible to represent the larger relation as a set of sub-relations. For example, as shown in FIG. 7B, there are only 200 legal combinations of color and size indicated by a sub-table 902, whereas there are only 500 legal combinations of color size and option3 as shown in a sub-table 904. In addition, a sub-table 906 illustrates that there are only 3 legal combinations of option4 and option7.

An otherwise prohibitively large table of all combinations of all $100^7$ option values would repeatedly enumerate, for example, the same 200 combinations of color and size within its rows. In practice, the repeating pattern of 200 combinations are extracted and replaced with a shorthand notation. By implementing an engine capable of generally interpreting this notation and tracing out the relation through the sub-relations, it is possible to represent the full relation as shown with no more than about 10,000 rows (instead of 100 trillion), which is very manageable in current RDBMs (Relational Database Management) systems.

Figure 7C:
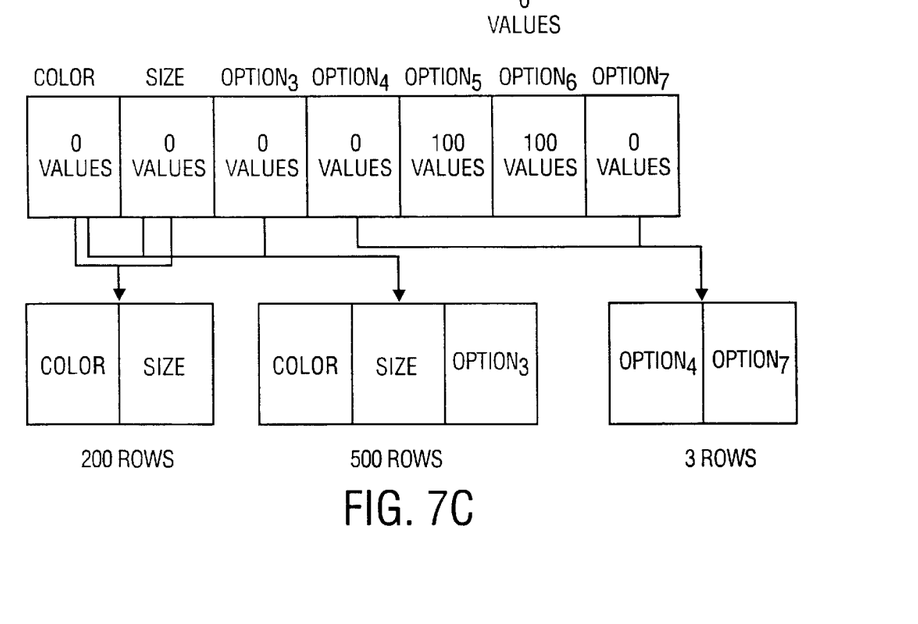
FIG. 7C shows a reduced main table and associated linked sub-tables in accordance with an embodiment of the invention.

In the described embodiment, the application engine 218 allows sub-tables to define relations among subsets of options in the main table and provides a syntactic shorthand for noting that these sub-table combinations are listed separately from a drastically reduced main table 910 as shown in FIG. 7C. By using the sub-tables 902–906 to define various orthogonal patterns in the data—specifically, those that contain no formally defined interdependencies with the set of the remaining such patterns—the main table 800 is drastically reduced, since those combinations (and the associated rows) corresponding to the various sub-tables are removed from the main table 800.

Figure 8:
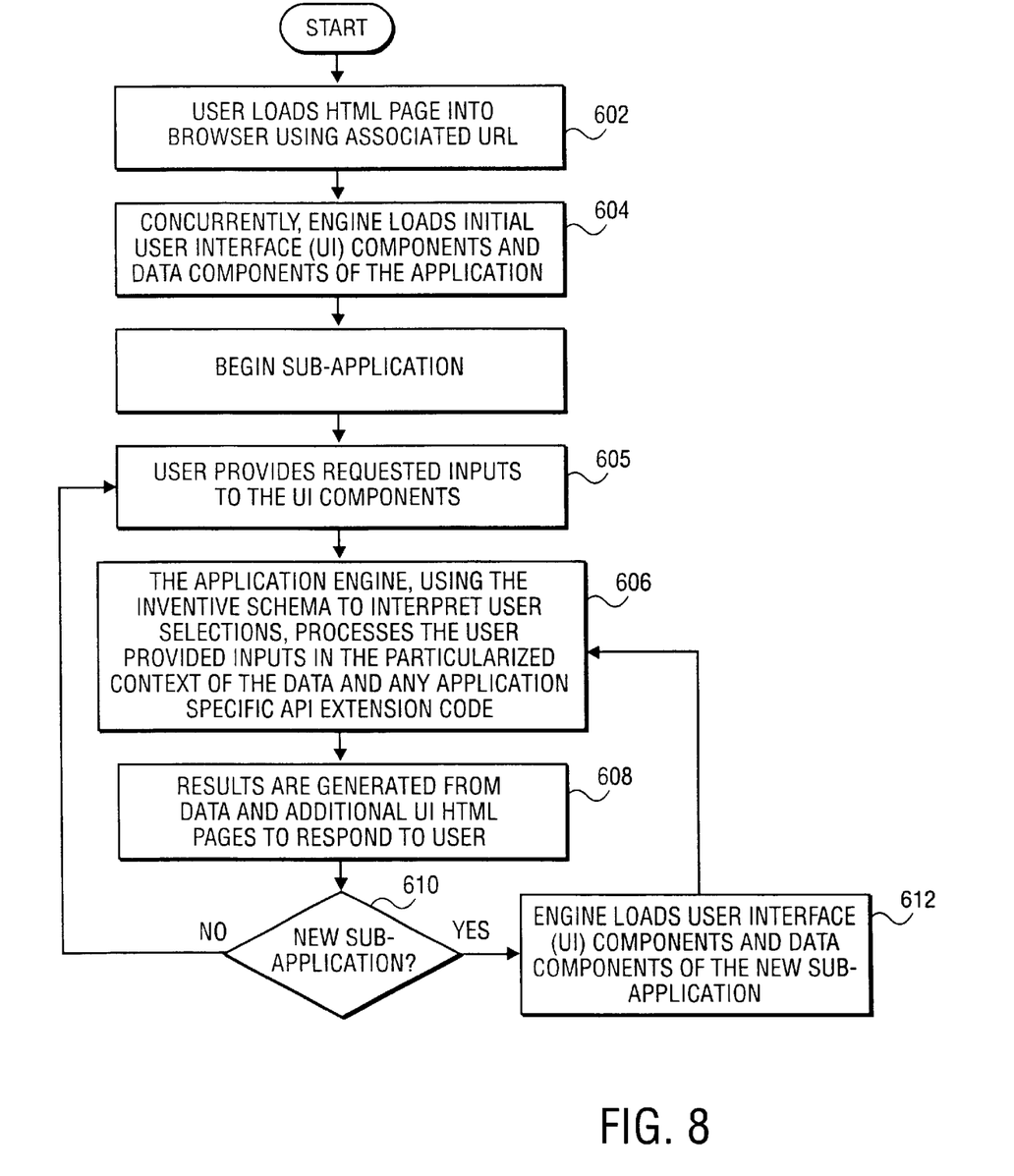
FIG. 8 shows a flowchart detailing a process for delivering and deploying an application which uses the inventive schema to interpret user selections in accordance with an embodiment of the invention.

FIG. 8 shows a flowchart detailing a process 600 for delivering and deploying an application that uses the inventive schema to interpret user selections in accordance with an embodiment of the invention. The process 600 begins at 602 with a user loading the application engine shell page into a browser using an associated URL. Once loaded and initialized, the application engine loads initial User Interface (UI) components and data components associated with the initial sub-application to be deployed at 604. At some time thereafter, during what is referred to as an event loop, the user provides requested inputs to the displayed UI components at 605 which the application engine (using the inventive schema to interpret user selections) processes at 606 in the particularized context of the sub-application's data and any API extension code. At 608, the corresponding results are generated from the data and displayed in additional HTML in response to the user supplied inputs. At 610, a determination is made whether or not a new sub-application is to be processed. If there are no additional sub-applications to process the application simply waits for the next user input in the current sub-application. However, if there are additional sub applications to process, control is passed to 612 where the additional components are loaded and control is then passed back to 606.

Figure 9:
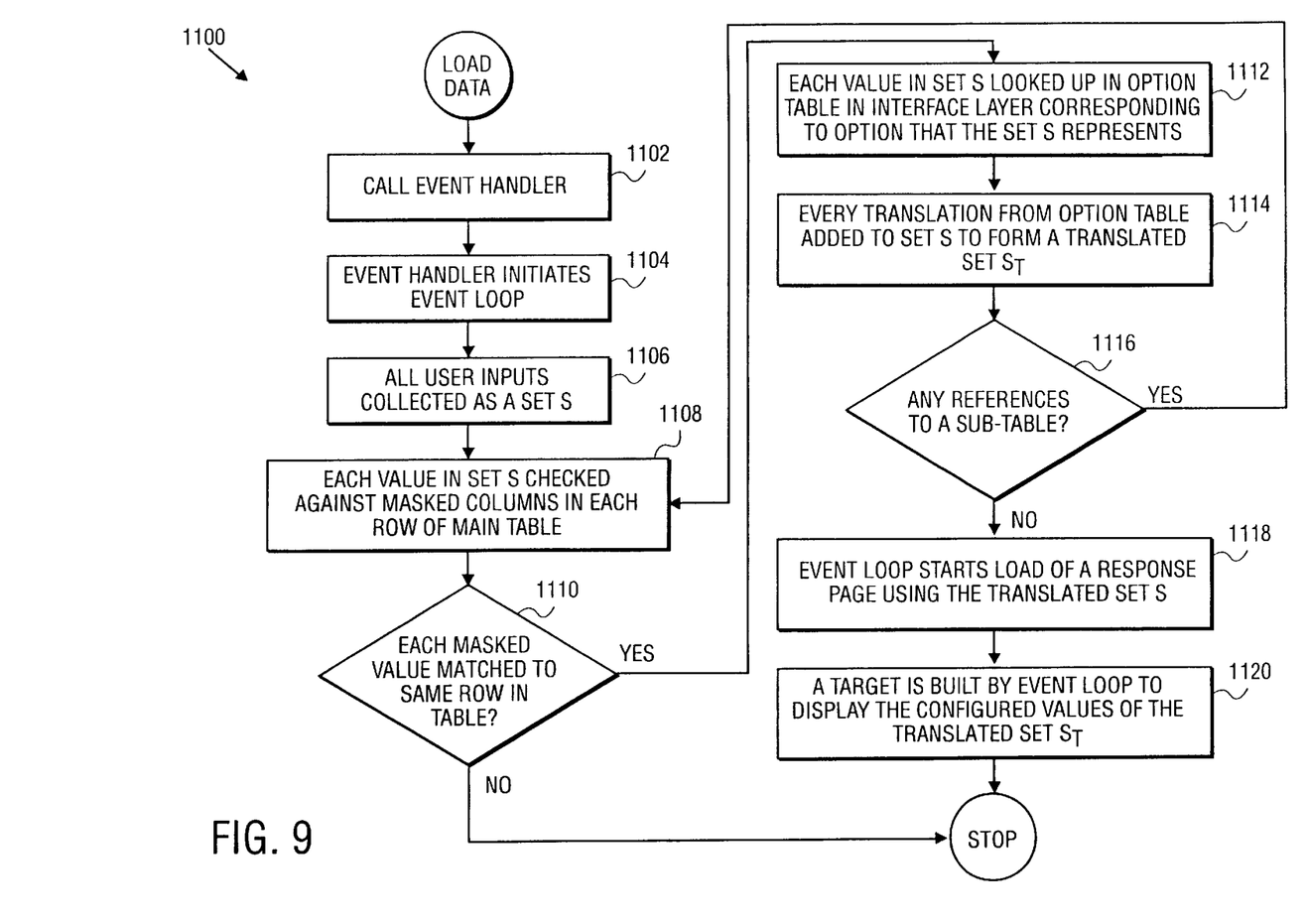
FIG. 9 is a flowchart detailing a process for interpreting user selections in the context of a relation distributed as a set of orthogonalized sub-relations represented in tables in accordance with an embodiment of the invention.

FIG. 9 is a flowchart detailing a process 1100 for interpreting user selections in the context of a relation distributed as a set of orthogonalized sub-relations represented in tables in accordance with an embodiment of the invention. It should be noted that the process 1100 is one possible implementation of the interpretation 614 of the process 600 and as such should not be construed as limiting the scope or intent of the invention.

The process 1100 begins at 1102 by the event handler being called in response to a user selected input, for example. Once the event handler has been called, the event handler initiates a corresponding event loop at 1104. During the event loop, all user inputs are collected as a set S at 1106. After being collected as the set S, each value in the set S is checked against the corresponding masked column in successive rows of the table at 1108, until a match is found for all such masked columns in a given row. A determination is made at 1110 whether or not each of the values in set S matches each corresponding masked column for at least one row in that table. If no such row exists, an exception condition has occurred and the process 1100 terminates.

On the other hand if such a row is found in the table, for each validated value in the set S as determined at 1110, each value in the set S is looked up in the associated option table in the corresponding interface layer. At 1114, every translation from the option table is then added to the set S. At 1116, the matched row is examined to determine if it contained any notations referencing sub-tables. If it did, then for each sub-table so referenced, the application engine recursively applies the matching process from 1108 through 1116 against the reduced set of columns in each sub-table. After all recursive table evaluations have been performed, the event loop starts to load a corresponding response page using the translated set S at 1118. At 1120, a target is built by the event loop to display the configured values of the translated set S.

In this way, the process 1100 has thereby calculated the result of looking up a set of user selections in a potentially vast number of explicitly defined rows, by instead repeatedly evaluating a set of much smaller sub-tables against that set of user selections.

Figure 10:
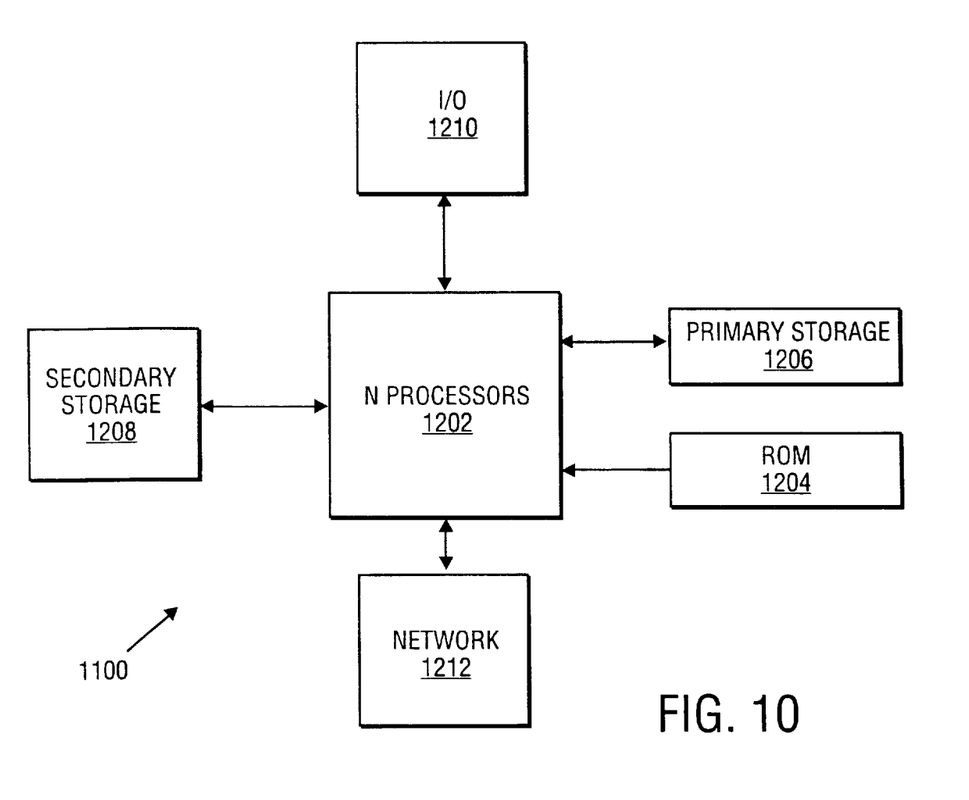
FIG. 10 illustrates a computer system that can be employed to implement the present invention.

FIG. 10 illustrates a computer system 1200 that can be employed to implement the present invention. The computer system 1200 or, more specifically, CPUs 1202, may be arranged to support a virtual machine, as will be appreciated by those skilled in the art. As is well known in the art, ROM acts to transfer data and instructions unidirectionally to the CPUs 1202, while RAM is used typically to transfer data and instructions in a bi-directional manner. CPUs 1202 may generally include any number of processors. Both primary storage devices 1204, 1206 may include any suitable computer-readable media. A secondary storage medium 1208, which is typically a mass memory device, is also coupled bi-directionally to CPUs 1202 and provides additional data storage capacity. The mass memory device 1208 is a computer-readable medium that may be used to store programs including computer code, data, and the like. Typically, mass memory device 1208 is a storage medium such as a hard disk or a tape which generally slower than primary storage devices 1204, 1206. Mass memory storage device 1208 may take the form of a magnetic or paper tape reader or some other well-known device. It will be appreciated that the information retained within the mass memory device 1208, may, in appropriate cases, be incorporated in standard fashion as part of RAM 1206 as virtual memory. A specific primary storage device 1204 such as a CD-ROM may also pass data unidirectionally to the CPUs 1202.

CPUs 1202 are also coupled to one or more input/output devices 1210 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1202 optionally may be coupled to a computer or telecommunications network, e.g., an Internet network or an intranet network, using a network connection as shown generally at 1212. With such a network connection, it is contemplated that the CPUs 1202 might receive information from the network, or might output information to the network in the course of performing the above-described method steps. Such information, which is often represented as a sequence of instructions to be executed using CPUs 1202, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the inventive methods of representing complex products and selling processes purely in data models are particularly suitable for implementation in browser environments, the methods may generally be applied in any suitable low bandwidth or high bandwidth system. Such low bandwidth systems include, but are not limited to virtual private networks, direct serial connections across telephone lines ("BBS systems"), and LANs and WANs regardless of network protocol.

While the present invention has been described as being used with a computer system that has an associated web browser and web server, it should be appreciated that the present invention may generally be implemented on any suitable computer system. Therefore, the present examples are to be considered as illustrative and not restrictive, and the invention is not to be limited to the details given herein, but may be modified within the scope of the appended claims along with their full scope of equivalents.

What is claimed is:

1. A computer implemented method of distributing a first relation amongst a set of orthogonal sub-relations, comprising:
   (a) identifying an orthogonal sub-relation of the set of orthogonal sub-relations;
   (b) removing the identified orthogonal sub-relation from the first relation;
   (c) replacing the removed orthogonal sub-relation with an associated reference to form a distributed relation, wherein the associated reference points to the removed sub-relation; and
   (d) repeating (a) through (c) for all orthogonal sub-relations included in the first relation so as to form a reduced first relation that is substantially reduced in size as compared to the first relation, such that the distributed relation is formed of the reduced first relation and the referenced orthogonal sub-relations.

2. A computer implemented method as recited in claim 1, wherein an engine reconstructs the first relation by evaluating the distributed relation.

3. A computer implemented method as recited in claim 2, wherein the evaluating further comprises using the reference to trace the corresponding orthogonal sub-relation.

4. A computer implemented method as recited in claim 3, wherein the first relation is reconstructed when all references have been used to trace their corresponding sub-relations such that the engine is then capable of evaluating all valid combinations as represented by the plurality of orthogonal sub-relations that are included in the first relation by evaluating the reduced first relation.

5. A computer implemented method as recited in claim 4, wherein the engine is an application engine.

6. A computer implemented method as recited in claim 5, wherein the application engine is incorporated in a browser resident in a client computer.

7. A computer implemented method as recited in claim 6, wherein the first relation is a set of options and associated option values, wherein the application engine interprets the set of options and associated option values based upon user supplied inputs.

8. A computer implemented method for interpreting a user selected set of options S each of which has an associated option value, wherein a main table T is used to define a relation across all options by listing all possible combinations of all option values, and wherein a plurality of associated sub-tables represent orthogonal relations between each of a plurality of subset of options as defined by the main table T, comprising:

(a) checking each value in the set S against a corresponding masked column in each row of the table T until a match is found for all such masked columns;

(b) determining if each of the values in the set S matches each of the corresponding masked columns for at least one row in the main table T;

(c) looking up each matching value in the set S in an associated option table;

(d) adding all translations for the associated option table to the set S to form a translated set S; and (e) determining if a matched row contains a reference to any of the plurality of sub-tables;

(f) repeating (b)–(e) when the matched row contains a reference to any of the sub-tables; and (g) displaying the translated set S.

9. A method as recited in claim 8, further comprising:

(h) calling an exception condition when it is determined that there are no matching values in the set S; and (i) terminating the method.

10. A computer program product for interpreting a user selected set of options S each of which has an associated option value, wherein a main table T is used to define a relation across all options by listing all possible combinations of all option values, and wherein a plurality of associated sub-tables represent orthogonal relations between each of a plurality of subset of options as defined by the main table T, comprising:

computer code that checks each value in the set S against a corresponding masked column in each row of the table T until a match is found for all such masked columns;

computer code that determines if each of the values in the set S matches each of the corresponding masked columns for at least one row in the main table T;

computer code looks up each matching value in the set S in an associated option table;

computer code that adds all translations for the associated option table to the set S to form a translated set S;

computer code that displays the translated set S; and a computer readable medium that stores the computer codes.

11. A computer program product according to claim 10 wherein the computer readable medium is a data signal embodied in a carrier wave.

12. A computer program product according to claim 10 further including computer code that calls an exception condition when it is determined that there are no matching values in the set S.

13. A computer program product according to claim 12 further including computer code that terminates the method when there are no matching values in the set S.

14. A computer program product for distributing a first relation amongst a set of orthogonal sub-relations, comprising:

computer code that identifies an orthogonal sub-relation of the set of orthogonal sub-relations;

computer code that removes the identified orthogonal sub-relation from the first relation;

computer code that replaces the removed orthogonal sub-relation with an associated reference to form a distributed relation, wherein the associated reference points to the removed sub-relation to form a reduced first relation that is substantially reduced in size as compared to the first relation, such that the distributed relation is formed of the reduced first relation and all pointed to orthogonal sub-relations; and a computer readable medium that stores the computer codes.

15. An apparatus that distributes a first relation amongst a set of orthogonal sub-relations, comprising:

software means for identifying an orthogonal sub-relation of the set of orthogonal sub-relations;

software means for removing the identified orthogonal sub-relation from the first relation;

software means for writing directly into a portion of a browser memory associated with a child context, a graphic in accordance with a user input event; and software means for replacing the removed orthogonal sub-relation with an associated reference to form a distributed relation, wherein the associated reference points to the removed sub-relation to form a reduced first relation that is substantially reduced in size as compared to the first relation, such that the distributed relation is formed of the reduced first relation and all pointed to orthogonal sub-relations.

* * * * *